(12) United States Patent
Plioska (10) Patent No.: US 11,448,258 B2
(45) Date of Patent: Sep. 20, 2022

(54) STRUT BEARING, ASSEMBLY, AND METHOD OF MAKING AND USING THE SAME

(71) Applicant: SAINT-GOBAIN PERFORMANCE PLASTICS PAMPUS GMBH, Willich (DE)

(72) Inventor: Lukas Plioska, Nettetal (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 10 days.

(21) Appl. No.: 16/731,162

(22) Filed: Dec. 31, 2019

(65) Prior Publication Data
US 2020/0217358 A1    Jul. 9, 2020

Related U.S. Application Data

(60) Provisional application No. 62/786,851, filed on Dec. 31, 2018.

(51) Int. Cl.
*F16C 17/04*     (2006.01)
*F16C 17/10*     (2006.01)

(52) U.S. Cl.
CPC .............. *F16C 17/10* (2013.01); *F16C 17/04* (2013.01); *B60G 2204/418* (2013.01); *F16C 2326/05* (2013.01)

(58) Field of Classification Search
CPC .................. F16C 17/04; F16C 17/10; F16C 33/201–206; F16C 33/122–127; F16C 33/26; F16C 2326/05; B60G 2204/418
See application file for complete search history.

(56) References Cited

U.S. PATENT DOCUMENTS

| | | |
|---|---|---|
| 6,979,129 B2 | 12/2005 | Farbaniec et al. |
| 8,328,427 B2 | 12/2012 | Kellam |
| 8,684,607 B2 | 4/2014 | Kaneko |
| 9,188,153 B2 | 11/2015 | Kaneko et al. |
| 9,194,426 B2 | 11/2015 | Sakairi et al. |
| 9,194,435 B2 | 11/2015 | Miyata et al. |
| 9,334,897 B2 | 5/2016 | Nagashima et al. |
| 9,370,983 B2 | 6/2016 | Kaneko et al. |
| 9,488,222 B2 | 11/2016 | Nagashima et al. |
| 10,082,180 B2 | 9/2018 | Nagashima |

(Continued)

FOREIGN PATENT DOCUMENTS

| | | |
|---|---|---|
| DE | 102009056351 A1 | 6/2011 |
| DE | 102010024601 A1 | 12/2011 |

(Continued)

OTHER PUBLICATIONS

Machine Translation of JP H09-303382 (Year: 1997).*
International Search Report and Written Opinion for PCT/EP2019/087190, dated Mar. 23, 2020, 13 pages.

*Primary Examiner* — Alan B Waits
(74) *Attorney, Agent, or Firm* — Abel Schillinger, LLP; David G Miranda (57) ABSTRACT

A strut bearing including a housing including a top piece and a bottom piece, and a plurality of low friction components each comprising a low friction layer comprising a low friction material, wherein the plurality of low friction components are bonded to the top piece or the bottom piece of the housing.

19 Claims, 5 Drawing Sheets

(56) References Cited

U.S. PATENT DOCUMENTS

| | | | |
|---|---|---|---|
| 2006/0288579 A1* | 12/2006 | Luo | F16C 33/26 29/898.12 |
| 2008/0310780 A1* | 12/2008 | Watai | F16C 17/18 384/420 |
| 2009/0097788 A1* | 4/2009 | Cooley | F16C 33/043 384/107 |
| 2012/0051915 A1* | 3/2012 | Suzuki | F03D 80/70 416/170 R |
| 2014/0254967 A1* | 9/2014 | Gonzalez | F16C 33/24 384/420 |
| 2014/0355915 A1 | 12/2014 | Saito et al. | |
| 2020/0025253 A1* | 1/2020 | Werner | F16C 17/10 |

FOREIGN PATENT DOCUMENTS

| | | | |
|---|---|---|---|
| DE | 102016208720 A1 | 11/2017 | |
| DE | 102016215755 A1 | 3/2018 | |
| DE | 102017103940 A1 | 8/2018 | |
| EP | 1159541 B1 | 12/2001 | |
| EP | 3078868 A1 | 10/2016 | |
| JP | 09303382 A * | 11/1997 | F16C 33/26 |
| WO | 2010023882 A1 | 3/2010 | |
| WO | 2012132176 A1 | 10/2012 | |
| WO | 2016024472 A1 | 2/2016 | |
| WO | 2019067830 A1 | 4/2019 | |

\* cited by examiner

| | Thickness (mm) | Weight (g) | Torque Value (Nm) (@4500N) | Torque Value (Nm) (@1000N) | Max-Min Torque |
|---|---|---|---|---|---|
| Strut Bearing A | 18 | 200 | 0.46 | 0.05 | 0.41 |
| Strut Bearing B | 5.5 | 44 | 5.8 | 2.96 | 2.84 |
| Strut Bearing C | 6 | 24.6 | 3 | 0.9 | 2.1 |

STRUT BEARING, ASSEMBLY, AND METHOD OF MAKING AND USING THE SAME

CROSS-REFERENCE TO RELATED APPLICATION(S)

This application claims priority under 35 U.S.C. § 119(e) to U.S. Patent Application No. 62/786,851 entitled "STRUT BEARING, ASSEMBLY, AND METHOD OF MAKING AND USING THE SAME," by Lukas PLIOSKA, filed Dec. 31, 2018, which is assigned to the current assignee hereof and incorporated herein by reference in its entirety.

FIELD OF THE DISCLOSURE

The present disclosure relates to bearings, and more particularly to strut bearings for installation within suspension assemblies for vehicles.

RELATED ART

A suspension assembly may be used to connect a vehicle component relative to another vehicle component and provide cushioning or damping to control movement of the components. The suspension assembly can be used in vehicles such as bicycles, motorcycles, ATVs, cars, trucks, SUVs, aircraft, spacecraft, watercraft, or in other vehicles. In a number of suspension assemblies, a suspension strut extends upward from a steering knuckle of a wheel and terminates into a joint with a top mount, which connects to a chassis of a vehicle. The strut may include a main strut rod with a hydraulic cylinder and a spring integral with the main rod for absorbing movement of the wheel. The joint existing between the top mount and the suspension strut may contain a strut bearing. The strut bearing allows a certain backlash of the suspension strut relative to the top mount, the wheel, and the rest of the suspension assembly.

Typically, the strut bearing is made of ball bearing or sliding bearing component, however, existing systems may cause uneven torque or unwanted friction, vibration, and noise. There continues to be a need for strut bearings for use in suspension assemblies to provide consistent torque, decreased friction, vibration, and noise while simplifying assemblies and increasing assembly lifetimes.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and suspension assembly arts.

Embodiments described herein are generally directed to a strut bearing and methods of creating and using a strut bearing within an assembly. In particular embodiments, the strut bearing may have a housing having a top piece and a bottom piece, and at least one low friction component disposed within an internal void between the top piece and the bottom piece, where the low friction component includes a low friction material, and where the low friction component contacts both the top piece and the bottom piece of the housing.

Figure 1:
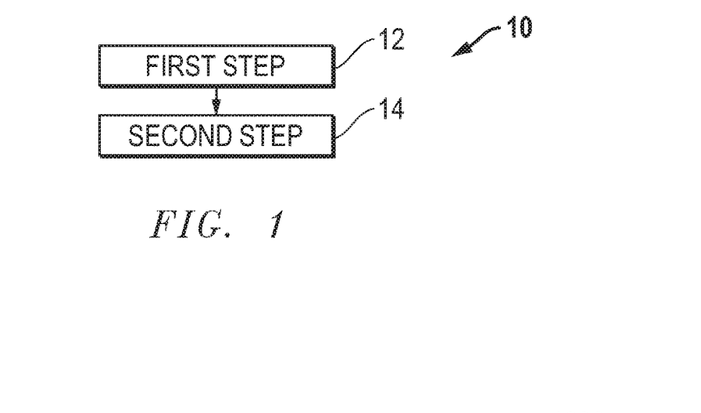
FIG. 1 includes a method of producing a strut bearing in accordance with an embodiment.

For purposes of illustration, FIG. 1 includes a diagram showing a forming process 10 for forming a strut bearing. The forming process 10 may include a first step 12 of forming a housing including a top piece and a bottom piece. The forming process 10 may further include a second step 14 of bonding at least one low friction component to at least one of the top piece or the bottom piece of the housing, where the low friction component includes a low friction material.

Referring to the first step 12, the housing can include materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. Particular polymers include polyketone, a thermoplastic polyimide, a polyetherimide, a polyphenylene sulfide, a polyether sulfone, a polysulfone, a polyamideimide, a derivative thereof, or a combination thereof. In a further example, the housing includes polyketone, such as polyether ether ketone (PEEK), polyether ketone, polyether ketone ketone, polyether ketone ether ketone, a derivative thereof, or a combination thereof. In an embodiment, particular polymers include polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The housing may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. In a number of embodiments, polyamide or nylon may be used for the housing material, such as Nylon 66.

Referring to the first step 12, in a number of embodiments, the housing may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The housing may be formed by at least one of chamfering, turning, reaming, forging, extruding, molding, sintering, rolling, or casting. In a number of embodiments, the housing may be formed by injection molding.

Figure 2A:
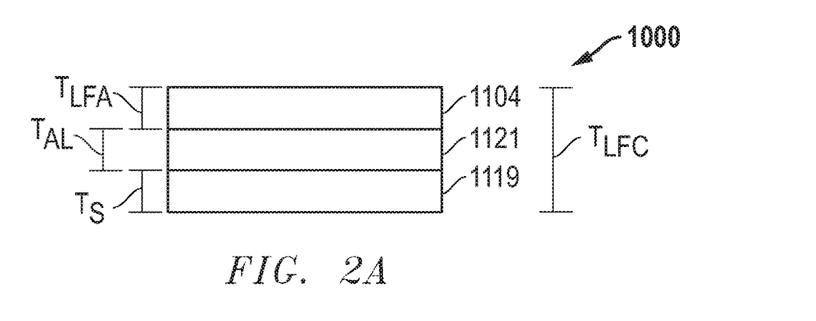
FIG. 2A includes a cross-sectional view of a low friction component in accordance with an embodiment.

FIG. 2A includes an illustration of a material 1000 that may be formed into the low friction component of the second step 14 of the forming process 10. The low friction component may include at least one substrate 1119. In an embodiment, the substrate 1119 can at least partially include a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the substrate 1119 includes a polyketone, a polyaramid, a polyimide, a polyetherimide, a polyamideimide, a polyphenylene sulfide, a polyphenylene sulfone, a polybenzimidazole, a derivation thereof, or a combination thereof.

In an embodiment, the substrate 1119 can at least partially include a metal. According to certain embodiments, the metal may include iron, copper, titanium, tin, aluminum, alloys thereof, or may be another type of metal. More particularly, the substrate 1119 can at least partially include a steel, such as, a stainless steel, carbon steel, or spring steel. For example, the substrate 1119 can at least partially include a 301 stainless steel. The 301 stainless steel may be annealed, ¼ hard, ½ hard, ¾ hard, or full hard. The substrate 1119 may include a woven mesh or an expanded metal grid. In a number of embodiments, the substrate 1119 can at least partially include a ceramic, such as barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The substrate 1119 may be formed by at least one of chamfering, turning, reaming, forging, extruding, molding, sintering, rolling, or casting.

The substrate 1119 can have a thickness Ts of between about 1 micron to about 2000 microns, such as between about 50 microns and about 1500 microns, such as between about 100 microns and about 1000 microns, such as between about 200 microns and about 500 microns. In a number of embodiments, the substrate 1119 may have a thickness Ts of between about 100 and 500 microns. In a number of embodiments, the substrate 1119 may have a thickness Ts of between about 250 and 450 microns. It will be further appreciated that the thickness Ts of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different than a thickness at a second location therealong. It can be appreciated that different substrates 1119 may have different thicknesses.

The composite material 1000 further includes at least one low friction layer 1104 overlying the substrate 1119. The low friction layer 1104 can be coupled to at least a portion of the substrate 1119. In a number of embodiments, the low friction layer 1104 can include a low friction material. Low friction materials can include, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a low friction material such as a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a further example, the low friction layer 1104 includes a low friction material including a polyketone, such as polyether ether ketone (PEEK), polyether ketone, polyether ketone ketone, polyether ketone ether ketone, a derivative thereof, or a combination thereof. In a further example, the low friction layer 1104 includes a low friction material including a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have a thickness $T_{LFA}$ of between about 1 micron to about 1000 microns, such as between about 10 microns and about 500 microns, such as between about 50 microns and about 400 microns, such as between about 100 microns and about 300 microns. In a number of embodiments, the low friction layer 1104 may have a thickness $T_{LFA}$ of between about 150 and 250 microns. It will be further appreciated that the thickness $T_{LFA}$ of the low friction layer 1104 may be any value between any of the minimum and maximum values noted above. The thickness of the low friction layer 1104 may be uniform, i.e., a thickness at a first location of the low friction layer 1104 can be equal to a thickness at a second location therealong. The thickness of the low friction layer 1104 may be non-uniform, i.e., a thickness at a first location of the low friction layer 1104 can be different than a thickness at a second location therealong. It can be appreciated that different low friction layers 1104 may have different thicknesses.

The composite material 1000 may also include at least one adhesive layer 1121 that may couple the low friction layer 1104 to the substrate 1119 and a low friction layer 1104. In another alternate embodiment, the substrate 1119, as a solid component, woven mesh or expanded metal grid, may be embedded between at least one adhesive layer 1121 included between the low friction layer 1104 and the substrate 1119.

The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness $T_{AL}$ of between about 1 micron to about 500 microns, such as between about 10 microns and about 250 microns, such as between about 30 microns and about 150 microns, such as between about 40 microns and about 100 microns. In a number of embodiments, the adhesive layer 1121 may have a thickness $T_{AL}$ of between about 50 and 250 microns. In a number of embodiments, the adhesive layer 1121 may have a thickness $T_{AL}$ of between about 80 and 120 microns. It will be further appreciated that the thickness $T_{AL}$ of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different than a thickness at a second location therealong. It can be appreciated that different adhesive layers 1121 may have different thicknesses.

Figure 2B:
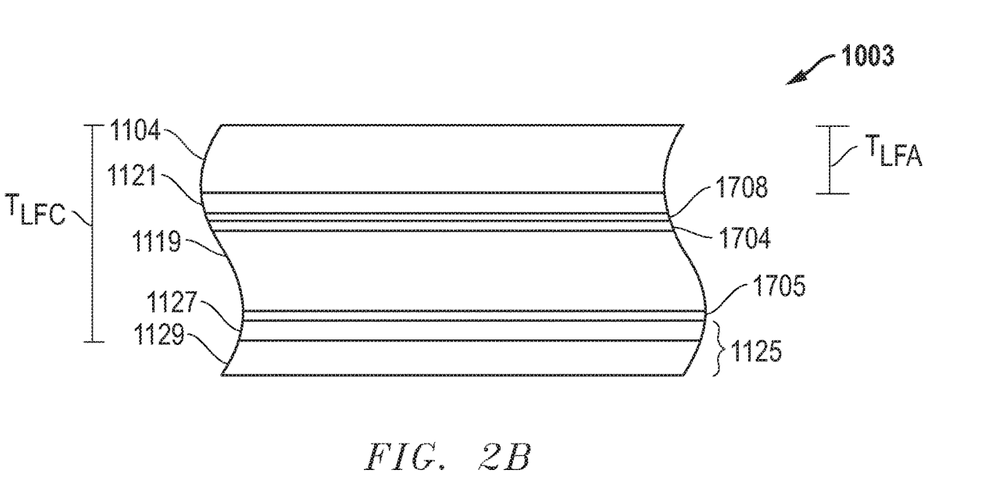
FIG. 2B includes a cross-sectional view of a low friction component in accordance with an embodiment.

FIG. 2B includes an illustration of an alternative embodiment of the composite material 1003 that may be formed into the low friction component of the second step 14 of the forming process 10. According to this particular embodiment, the composite material 1003 may be similar to the composite material 1000, except this composite material 1003 may also include at least one corrosion protection layer 1704, 1705, and 1708, and a corrosion resistant coating 1124 that can include an adhesion promoter layer 1127 and an epoxy layer 1129 that may couple to the substrate 1119 and a low friction layer 1104.

The substrate 1119 may be coated with corrosion protection layers 1704 and 1705 to prevent corrosion of the composite material 1003 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

As stated above, the composite material 1003 may further include a corrosion resistant coating 1125. The corrosion resistant coating 1125 can have a thickness of about 1 to 50 microns, such as about 5 to 20 microns, and such as about 7 to 15 microns. The corrosion resistant coating 1125 can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above. In an embodiment, the epoxy layer 1129 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the composite material as compared to a composite material without conductive fillers.

In an embodiment, the composite material 1000, 1003 and/or the resulting low friction component formed from the composite material 1000, 1003 can have a thickness $T_{LFC}$ in a range of 0.01 mm and 5 mm, such as in a range of 0.15 mm and 2.5 mm, or even in a range of 0.2 mm and 1 mm. It will be further appreciated that the composite material 1000, 1003 can have a thickness $T_{LFC}$ that may be any value between any of the minimum and maximum values noted above. The composite material 100, 1003 can have a thickness $T_{LFC}$ that may be uniform, i.e., a thickness at a first location of the composite material can be equal to a thickness at a second location therealong. The composite material 100, 1003 can have a thickness $T_{LFC}$ may be non-uniform, i.e., a thickness at a first location of the composite material can be different than a thickness at a second location therealong.

In an embodiment, under step 14 of FIG. 1, any of the layers of the composite material 1000, 1003 as described above, can each be disposed in a roll and peeled therefrom to join together under pressure, at elevated temperatures (hot or cold pressed or rolled), by an adhesive, or by any combination thereof. Any of the layers of the composite material 1000, 1003, as described above, may be laminated together such that they at least partially overlap one another.

In an embodiment, under step 14 of FIG. 1, at least one low friction component may be bonded to at least one of the top piece or the bottom piece of the housing, such as by being molecularly associated or connected with at least one of the top piece or the bottom piece of the housing. Molecularly associated or connected to each other means that the low friction component and at least one of the top piece or the bottom piece of the housing are held together via molecular forces. At the interface there will be a partial mixing of the molecules of the low friction component or intervening material and at least one of the top piece or the bottom piece of the housing. In a number of embodiments, at least one low friction component may be bonded to at least one of the top piece or the bottom piece of the housing by molding, use of an adhesive, welding, mechanical attachment, or may be bonded a different way. In a number of embodiments, the housing may be formed by an injection molding process, and the low friction component may be overmolded to or with at least one of the top piece or the bottom piece of the housing.

Figure 3:
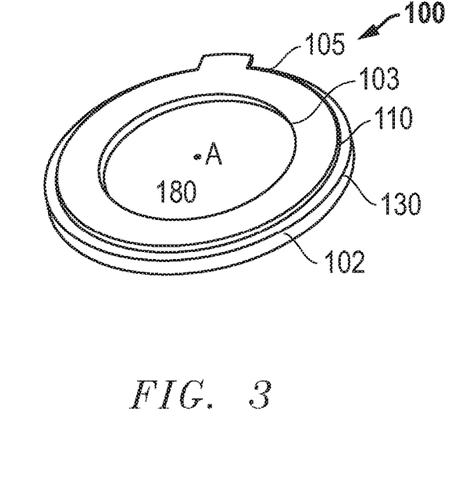
FIG. 3 includes a top view of an assembled strut bearing in accordance with an embodiment.
Figure 4:
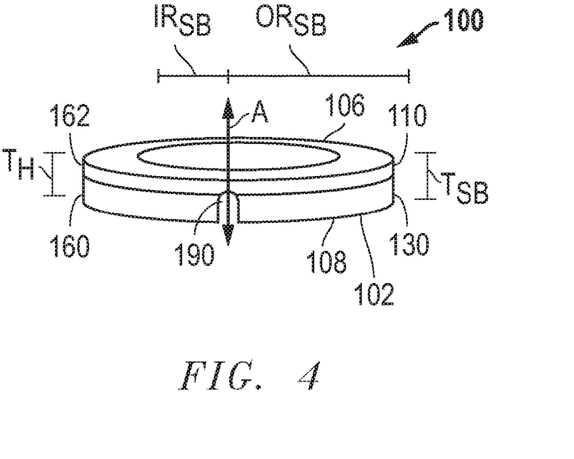
FIG. 4 includes a side view of an assembled strut bearing in accordance with an embodiment.
Figure 5:
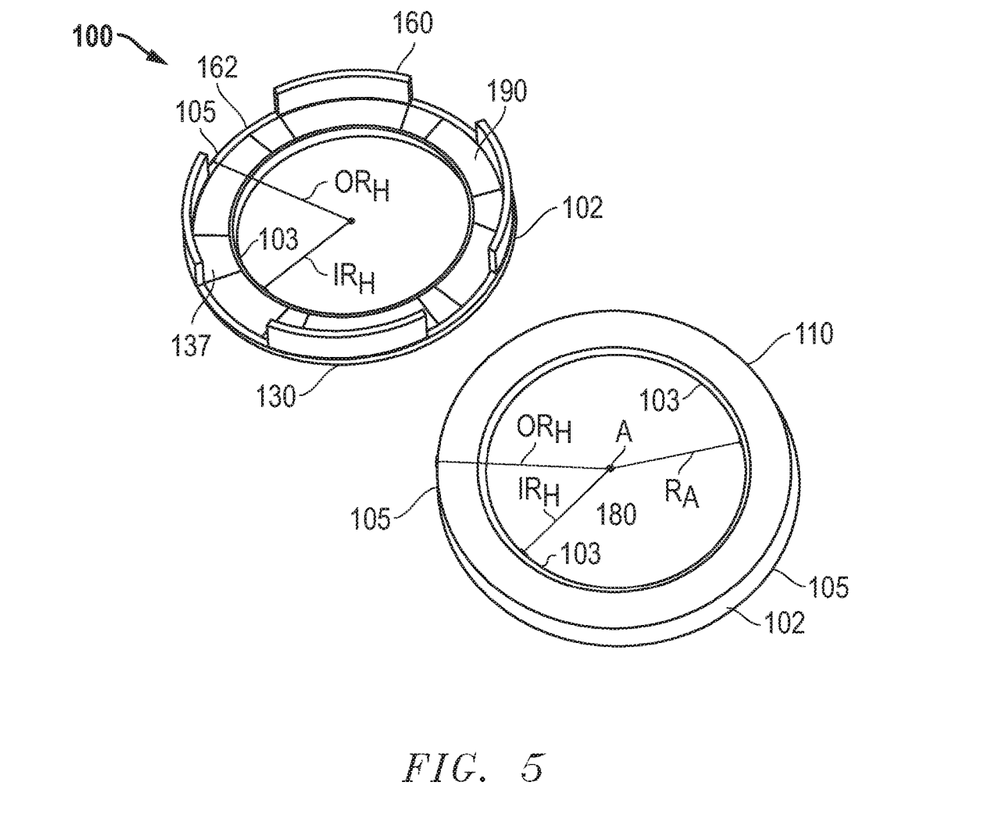
FIG. 5 includes a top view of an unassembled housing of a strut bearing in accordance with an embodiment.
Figure 6A:
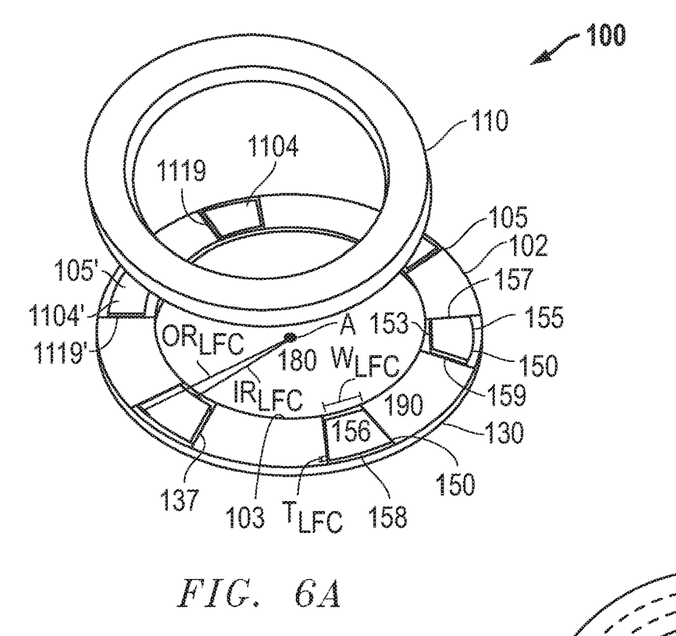
FIG. 6A includes a top perspective view of an unassembled strut bearing in accordance with an embodiment.
Figure 6B:
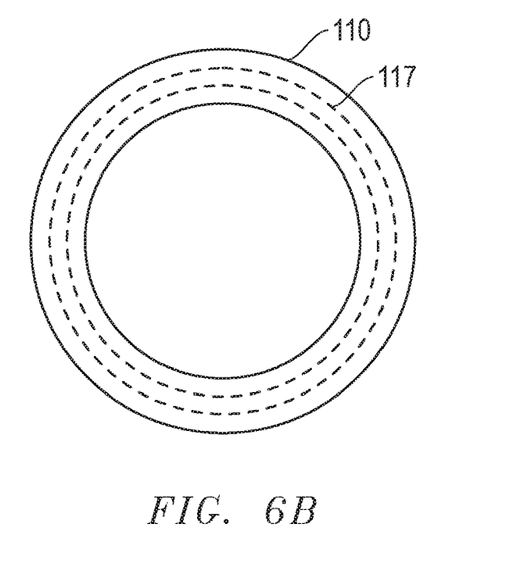
FIG. 6B includes a top perspective view of an unassembled housing in accordance with an embodiment.

Turning now to the strut bearing formed according to embodiments described herein, FIG. 3 includes a top view illustration of an assembled strut bearing 100 in accordance with embodiments described herein. FIG. 4 includes a side view illustration of an assembled strut bearing 100 in accordance with embodiments described herein. FIG. 5 includes a top view illustration of an unassembled strut bearing 100 housing 102 in accordance with embodiments described herein. FIG. 6A includes a top view illustration of an unassembled strut bearing 100 in accordance with embodiments described herein. FIG. 6B includes a top perspective view of an unassembled housing 102 in accordance with embodiments described herein. For purposes of illustration, FIGS. 3-6B show views of a strut bearing 100 in accordance with embodiments described herein, which can include a housing 102 oriented about a central axis A. The housing 102 may further include a top piece 110 and a bottom piece 130. The housing 102 (including at least one of the top piece 110 and the bottom piece 130) may include an inner radial edge 103 and an outer radial edge 105. The inner radial edge 103 may at least partially define an aperture 180 in the housing 102. The housing 102 (including at least one of the top piece 110 and the bottom piece 130) can include a first axial surface 106 and a second axial surface 108 opposite the first axial surface 106 oriented down the central axis A and spaced apart by a thickness $T_H$. The housing 102 may have a polygonal, oval, circular, semi-circular, or substantially circular cross-section when viewed in a plane perpendicular to the central axis A. In a number of embodiments, the top piece 110 and the bottom piece 130 of the housing 102 may be adapted to rotate relative to each other.

In a number of embodiments, the housing 102 (including at least one of the top piece 110 and the bottom piece 130) may have a particular thickness $T_H$. For purposes of embodiments described herein and as shown in FIG. 4, the thickness $T_H$ of the housing 102 is the distance from the first axial surface 106 to the second axial surface 108. According to a certain embodiment, the thickness $T_H$ of the housing 102 may be at least about 1 mm, such as, at least about 2 mm or at least about 5 mm or at least about 10 mm or at least about 15 mm or even at least about 20 mm. According to still other embodiments, the thickness $T_H$ of the housing 102 may be not greater than about 20 mm, such as, not greater than about 15 mm, not greater than about 10 mm or even not greater than about 5 mm. It will be appreciated that the thickness $T_H$ of the housing 102 may be within a range between any of the minimum and maximum values noted above. It will be further appreciated that the thickness $T_H$ of the housing 102 may be any value between any of the minimum and maximum values noted above. It can also be appreciated that the thickness $T_H$ of the housing 102 may vary along its circumference. It can be appreciated that different housing pieces 110, 130 may have different thicknesses.

In a number of embodiments, the housing 102 (including at least one of the top piece 110 and the bottom piece 130) may have a particular inner radius $IR_H$. For purposes of embodiments described herein and as shown in FIG. 5, the inner radius, $IR_H$ of the housing 102 is the distance from the central axis A to the inner radial edge 103. According to certain embodiment, the inner radius $IR_H$ of the housing 102 may be at least about 10 mm or at least about 20 mm or at least about 30 mm or at least about 40 mm or even at least about 50 mm. According to still other embodiments, the inner radius $IR_H$ of the housing 102 may be not greater than about 100 mm, such as, not greater than about 50 mm or even not greater than about 25 mm. It will be appreciated that the inner radius $IR_H$ of the housing 102 may be within a range between any of the minimum and maximum values noted above. It will be further appreciated that the inner radius $IR_H$ of the housing 102 may be any value between any of the minimum and maximum values noted above. It can also be appreciated that the inner radius $IR_H$ of the top piece 110 of the housing 102 may vary from the inner radius $IR_H$ of the bottom piece 130 of the housing 102. It can also be appreciated that the inner radius $IR_H$ of the housing 102 may vary along its circumference. It can be appreciated that different housing pieces 110, 130 may have different inner radii.

In a number of embodiments, the housing 102 (including at least one of the top piece 110 and the bottom piece 130) may have a particular outer radius $OR_H$. For purposes of embodiments described herein and as shown in FIG. 5, the outer radius $OR_H$ of the housing 102 is the distance from the central axis A to the outer radial edge 105. According to certain embodiment, the outer radius $OR_H$ of the housing 102 may be at least about 10 mm or at least about 20 mm or at least about 30 mm or at least about 40 mm or even at least about 50 mm. According to still other embodiments, the outer radius $OR_H$ of the housing 102 may be not greater than about 100 mm, such as, not greater than about 50 mm or even not greater than about 25 mm. It will be appreciated that the outer radius $OR_H$ of the housing 102 may be within a range between any of the minimum and maximum values noted above. It will be further appreciated that the outer radius $OR_H$ of the housing 102 may be any value between any of the minimum and maximum values noted above. It can also be appreciated that the outer radius $OR_H$ of the top piece 110 of the housing 102 may vary from the outer radius $OR_H$ of the bottom piece 130 of the housing 102. It can also be appreciated that the outer radius $OR_H$ of the housing 102 may vary along its circumference. It can be appreciated that different housing pieces 110, 130 may have different outer radii.

In an embodiment, and the inner radial edge 103 of the housing 102 (including at least one of the top piece 110 and the bottom piece 130) may at least partially define an aperture 180 in the strut bearing 100. The aperture 180 may have a polygonal, oval, circular, semi-circular, or substantially circular cross-section when viewed in a plane generally perpendicular to the central axis A. The aperture 180 may be non-uniform in shape.

Turning to FIG. 6A, the strut bearing 100 may further include at least one low friction component 150. Each low friction component 150 may include an inner radial edge 153, an outer radial edge 155, a first circumferential edge 157 and a second circumferential edge 159. The low friction component 150 can include a first axial surface 156 and a second axial surface 158 opposite the first axial surface 106 oriented down the central axis A and spaced apart by a thickness $T_I$. The low friction component 150 may have a polygonal, oval, circular, semi-circular, or substantially circular cross-section when viewed in a plane perpendicular to the central axis A. As shown in FIG. 6A, the plurality of low friction components 150 may include a substrate 1119 and a corresponding low friction layer 1104 overlying each substrate 1119. While each low friction component 150 can have its own substrate 1119 that carries low friction material as described herein, a plurality of low friction components 1150 can share a common substrate 1119, and can form an annular ring.

In a number of embodiments, as shown in FIG. 6, the low friction component 150 may have a width $W_{LFC}$ as measured in an arc length from the first circumferential edge 157 to the second circumferential edge 159. Width $W_{LFC}$ can be calculated by the formula $$W_{LFC} = \frac{C\theta}{360},$$

where θ is the angle formed between the first circumferential edge 157 and the second circumferential edge 159 with respect to the central axis A, and C is the circumference of the strut bearing 100 along a best fit circle formed by inner radial edges 153 of the low friction component 150 of the strut bearing 100. According to certain embodiment, the width $W_{LFC}$ of the at least low friction component 150 may be at least about 1 mm, such as, at least about 2 mm or at least about 5 mm or at least about 10 mm or at least about 20 mm or even at least about 50 mm. According to still other embodiments, the width $W_{LFC}$ of the low friction component 150 may be not greater than about 100 mm, such as, not greater than about 50 mm or even not greater than about 25 mm. It will be appreciated that the width $W_{LFC}$ of the low friction component 150 may be within a range between any of the minimum and maximum values noted above. It will be further appreciated that the width $W_I$ of the low friction component 150 may be any value between any of the minimum and maximum values noted above. It can also be appreciated that the width $W_{LFC}$ of the low friction component 150 may vary along its circumference and may vary across the plurality of low friction components 150. It can be appreciated that different low friction components 150, 150 may have different widths.

The low friction component may span an arc of between 1° and 90° of the circumference of the strut bearing 100, such as between 1° and 45°, such as between 1° and 30°, such as between 1° and 20°, or such as between 1° and 15°.

As shown in both FIGS. 5 and 6A, the strut bearing 100 may include a plurality of low friction components 150, 150. The low friction components 150 can be circumferentially offset from one another. The low friction components 150, 150 can be circumferentially offset from one another by at least one groove 137 formed in the housing 150 (including at least one of the top piece 110 and the bottom piece 130). The at least one groove 137 may be gaps, slots, channels, or troughs into which the low friction component 150 may be disposed. The at least one radial slot 137 may have a polygonal, oval, circular, semi-circular, or substantially circular cross-section when viewed in a plane generally perpendicular to the central axis A.

As stated previously, and as shown in FIG. 5, the inner radial edge 103 or outer radial edge 105 of the housing 102 (including at least one of the top piece 110 and the bottom piece 130) may include a plurality of axial tabs 160, each extending from the housing 102. As shown in both FIGS. 4 and 5, the axial tabs 160 can be circumferentially offset from one another. The axial tabs 160 can be circumferentially offset from one another and may pair or couple the top piece 110 and the bottom piece 130 of the housing 102 together through corresponding axial slots 162 to form an internal void 190. The low friction component 150 may be disposed within the internal void 190 created between the coupling together of the top piece 110 and a bottom piece 130 of the housing 102. The at least one axial tab 110 may have a polygonal, oval, circular, semi-circular, or substantially circular cross-section when viewed in a plane generally perpendicular to the central axis A. In an embodiment, the top piece 110 and the bottom piece 130 of the housing 102 may attach via a different attachment means including at least one of screw threads or threadings, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, adhesive (including, but not limited to, the adhesives listed for the adhesive layer 1121 above), or may be attached together a different way.

In an embodiment, as stated above, the low friction component 150 may overmolded or otherwise bonded with at least one of the top piece 110 or the bottom piece 130 of the housing 102. In an embodiment, the overmolding may be done to the substrate 1119 of the low friction component 150 leaving the low friction layer exposed. As shown best in FIG. 4B, the substrate 1119 may be overmolded to the bottom piece 130 while at least one low friction layer 1104 may be exposed. In an embodiment, the low friction layer 1104 may contact an opposing surface 115 of the other of the top piece 110 or the bottom piece 130 of the housing 102 opposite to which the low friction component 150 may be bonded. As shown best in FIG. 4B, the low friction layer 1104 contacts the opposing surface 115 of the top piece 110 of the housing 102 opposite to which the low friction component 150 may be bonded (i.e. the bottom piece 130). This may also be done with the low friction layer 1104 contacts the opposing surface of the bottom piece 130 of the housing 102 while the low friction component 150 may be bonded to the top piece 110. In an embodiment, plurality of low friction component layers 1104 may be exposed so that the plurality of low friction layers 1104 contact an opposing surface 115 of the other of the top piece 110 or the bottom piece 130 of the housing 102 opposite to which the low friction component 150 may be bonded.

In a number of embodiments, as stated above, the top piece 110 and the bottom piece 130 of the housing 102 may be adapted to rotate relative to each other. The rotation of the top piece 110 and the bottom piece 130 of the housing 102 relative to each other may define an annular track 117 along the opposing surface 115 along which the low friction layer 1104 slides. The sliding of the low friction layer 1104 along the annular track 117 along the opposing surface 115 may form a low friction interface with the opposing surface of the top piece 110 and the bottom piece 130 of the housing 102. As shown best in FIG. 6B, for example, the low friction layer 1104 contacts the opposing surface 115 of the top piece 110 of the housing 102 and when the top piece 110 and the bottom piece 130 rotate relative to each other, the low friction layer 1104 slides along the annular track 117 in the opposing surface 115 of the top piece 110 opposite to which the low friction component 150 may be bonded (i.e. the bottom piece 130). As stated above, the orientation may be reversed such that the annular track and opposing surface lies on the bottom piece 130 while the top piece 110 may be bonded to the low friction component 150. In an embodiment, the low friction layer 1104 may contact less than 80% of the surface area of the annular track 117, such as less than 70% of the surface area of the annular track 117, less than 60% of the surface area of the annular track 117, less than 50% of the surface area of the annular track 117, or less than 40% of the surface area of the annular track 117.

In a number of embodiments, as shown in FIG. 4A, the strut bearing 100 can have a thickness $T_{SB}$. For purposes of embodiments described herein, the thickness $T_{SB}$ of the strut bearing 100 is the distance from the first axial surface 106 to the second axial surface 108 of the housing 102 (including at least one of the top piece 110 and the bottom piece 130). According to certain embodiment, the thickness $T_{SB}$ of the strut bearing 100 may be at least about 1 mm, such as, at least about 2 mm or at least about 5 mm or at least about 10 mm or even at least about 15 mm. According to still other embodiments, the thickness $T_{SB}$ of the strut bearing 100 may be not greater than about 20 mm, such as, not greater than about 15 mm, not greater than about 10 mm or even not greater than about 5 mm. It will be appreciated that the thickness $T_{SB}$ of the strut bearing 100 may be within a range between any of the minimum and maximum values noted above. It will be further appreciated that the thickness $T_{SB}$ of the strut bearing 100 may be any value between any of the minimum and maximum values noted above. For example, the axial the thickness $T_{SB}$ of the strut bearing 100 may be less than 10 mm. It can also be appreciated that the thickness $T_{SB}$ of the strut bearing 100 may vary along its circumference.

In a number of embodiments, as shown in FIG. 4, the strut bearing 100 may have an overall inner radius $IR_{SB}$. For purposes of embodiments described herein, the inner radius $IR_{SB}$ of the strut bearing 100 is the distance from the central axis A to the radially innermost periphery of the strut bearing 100, which may be the inner radial edge 103 of the housing 102 (including at least one of the top piece 110 and the bottom piece 130). According to certain embodiment, the inner radius $IR_{SB}$ of the strut bearing 100 may be at least about 1 mm, such as, at least about 10 mm or at least about 20 mm or at least about 30 mm or at least about 40 mm or even at least about 50 mm. According to still other embodiments, the inner radius $IR_{SB}$ of the strut bearing 100 may be not greater than about 500 mm, such as, not greater than about 250 mm or even not greater than about 100 mm. It will be appreciated that the inner radius $IR_{SB}$ of the strut bearing 100 may be within a range between any of the minimum and maximum values noted above. It will be further appreciated that the inner radius $IR_{SB}$ of the strut bearing 100 may be any value between any of the minimum and maximum values noted above. It can also be appreciated that the inner radius $IR_{SB}$ of the strut bearing 100 may vary along its circumference.

In a number of embodiments, as shown in FIG. 4, the strut bearing 100 may have an overall outer radius $OR_{SB}$. For purposes of embodiments described herein, the outer radius $OR_{SB}$ of the strut bearing 100 is the distance from the central axis A to the radially outermost periphery of the strut bearing 100, which may be the outer radial edge 105 of the housing 102 (including at least one of the top piece 110 and the bottom piece 130). According to certain embodiment, the outer radius $OR_{SB}$ of the strut bearing 100 may be at least about 10 mm or at least about 20 mm or at least about 30 mm or at least about 40 mm or even at least about 50 mm. According to still other embodiments, the outer radius $OR_{SB}$ of the strut bearing 100 may be not greater than about 500 mm, such as, not greater than about 250 mm or even not greater than about 100 mm. It will be appreciated that the outer radius $OR_{SB}$ of the strut bearing 100 may be within a range between any of the minimum and maximum values noted above. It will be further appreciated that the outer radius $OR_{SB}$ of the strut bearing 100 may be any value between any of the minimum and maximum values noted above. It can also be appreciated that the outer radius $OR_{SB}$ of the strut bearing 100 may vary along its circumference.

Figure 7:
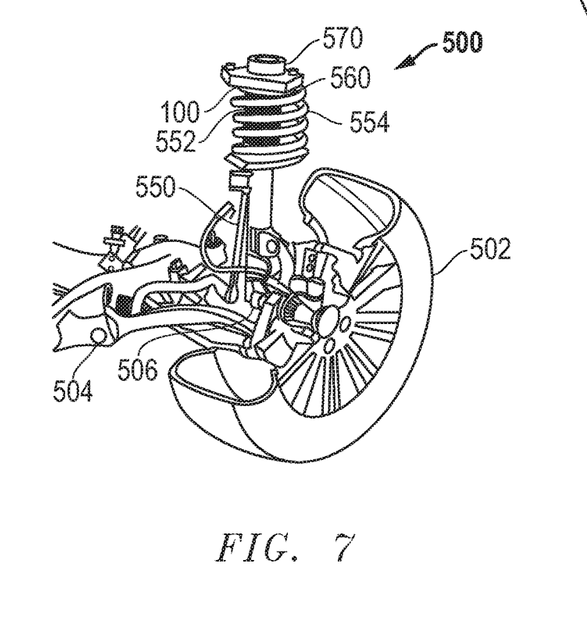
FIG. 7 includes a side view of a strut bearing within an assembly in accordance with an embodiment.

For purposes of illustration, FIG. 7 includes a side view of a strut bearing 100 within an assembly 500 in accordance with embodiments described herein. The assembly 500 may be a suspension assembly or strut assembly for a vehicle. In a number of embodiments, the strut bearing 100 may be a suspension strut bearing for a vehicle. In a number of embodiments, the assembly 500 can include a wheel 502, a chassis or vehicle body 504, a steering knuckle 506, and a suspension strut 550 extending upwards from the steering knuckle 506. The suspension strut 550 may include and terminate into a joint 560 with a top mount 570 (which may also connect with a chassis or vehicle body 504). In a number of embodiments, the suspension strut 550 may include a main strut rod 552 and a spring 554 integral with and surrounding the strut rod 552. The strut rod 552 may include a hydraulic cylinder. The joint 560 may house the strut bearing 100 within the assembly 500. In an embodiment, the strut rod 552 may be adapted to rotate relative to at least one of the chassis or vehicle body 504 or the top mount 570 to rotate the wheel 502. This rotation may allow the top piece 110 and bottom piece 130 of the strut bearing 100 to rotate relative to each other causing the low friction interface described above. In another embodiment, the strut rod 552 and at least part of the strut bearing 100 may be adapted to rotate relative to at least one of the chassis or vehicle body 504 or the top mount 570. The suspension strut 550 may further include fasteners between any of their components including, but not limited to, screw threads or threadings, bolts, battens, buckle, clamp, clip, flange, frog, grommet, hook-and-eye, latch, peg, nail, rivet, screw anchor, snap fastener, stitch, threaded fastener, tie, toggle bolt, wedge anchors, or may be another type. The strut bearing 100 can be disposed adjacent to, or contacting the strut rod 552 through its aperture 180 in an assembly 500. In a number of embodiments, the aperture 180 may be adapted to surround the top of the strut including any of the suspension strut 550 components listed above. In a number of embodiments, the strut bearing 100 may be installed or disposed around the strut rod 552 in the assembly 500. In a number of embodiments, the strut bearing housing 102 may be adapted to mate with, surround, or otherwise house or contact the top of the strut including any of the suspension strut 550 components listed above.

Figure 8A:
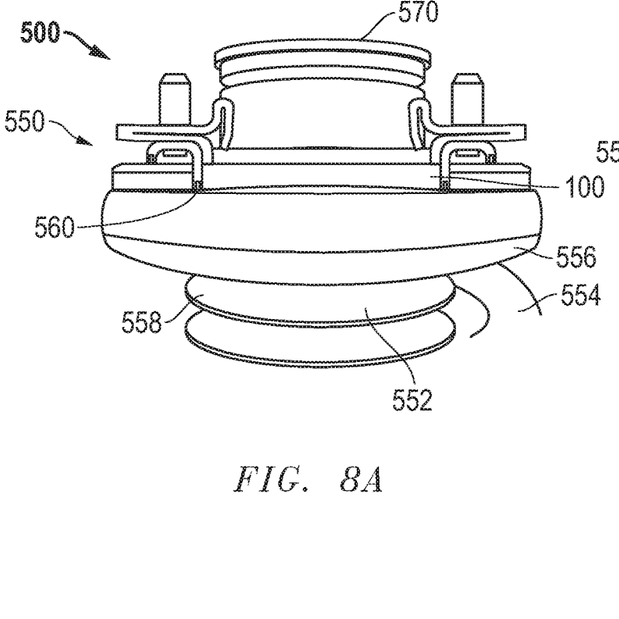
FIG. 8A includes a side view of a strut bearing within an assembly in accordance with an embodiment.
Figure 8B:
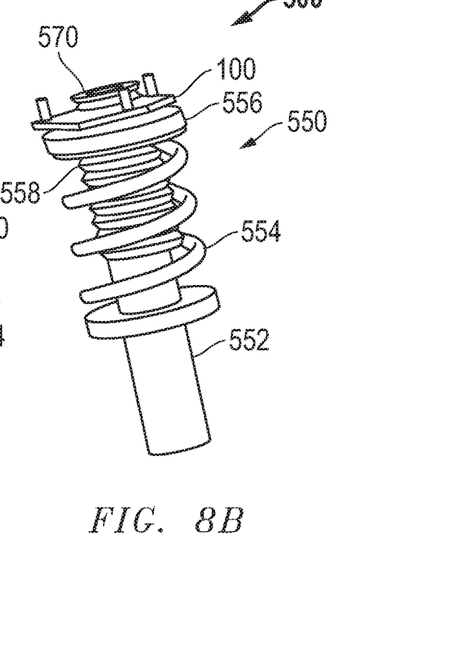
FIG. 8B includes a perspective side view of a strut bearing within an assembly in accordance with an embodiment.

For purposes of illustration, FIG. 8A includes a cross-sectional view of a strut bearing 100 within an assembly 500 in accordance with embodiments described herein. FIG. 8B includes a cut away side view of a strut bearing 100 within an assembly 500 in accordance with embodiments described herein. Similar to FIG. 7, FIGS. 8A-8B show a strut bearing 100 in a joint 560 between the top mount 570 and the main strut rod 552 of the suspension strut 550. The assembly 500 may further include a spring seat 556 which may at least partially house the spring 554. The assembly 500 may further include a dust boot 558 that at least partially surrounds the main strut rod 552.

In a particular embodiment, the strut bearing 100 can be installed with a strut assembly 500 including an inner member including a strut rod 552 with the strut bearing 100 disposed around the strut rod 552. The strut bearing 100 may include a housing 102 including a top piece 110 and a bottom piece 130, and at least one low friction component 100 including a plurality of low friction layers 1104 each including a low friction material, where the low friction component 100 may be bonded to at least one of the top piece 110 or the bottom piece 130 of the housing 102.

In at least one embodiment, the assembly 500 may include a lubricant on any of its components. In at least one embodiment, the lubricant may include a grease including at least one of lithium soap, lithium disulfide, graphite, mineral or vegetable oil, silicone grease, fluorether-based grease, apiezon, food-grade grease, petrochemical grease, or may be a different type. In at least one embodiment, the lubricant may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based oil, or may be a different type. In at least one embodiment, the lubricant may include a solid based lubricant including at least one of lithium soap, graphite, boron nitride, molybdenum disulfide, tungsten disulfide, polytetrafluoroethylene, a metal, a metal alloy, or may be a different type.

In an embodiment, the assembly 500 can be installed or assembled by an assembly force of at least 10 N a longitudinal direction relative to the inner member, such as at least 20 N, at least 30 N, at least 40 N, at least 50 N, at least 100 N, or even at least 150 N. In a further embodiment, the assembly 500 can be installed or assembled by an assembly force of at least 1 kgf in a longitudinal direction relative to the inner member, such as no greater than 1500 N, no greater than 1000 N, no greater than 750 N, or even no greater than 250 N.

Figure 9:
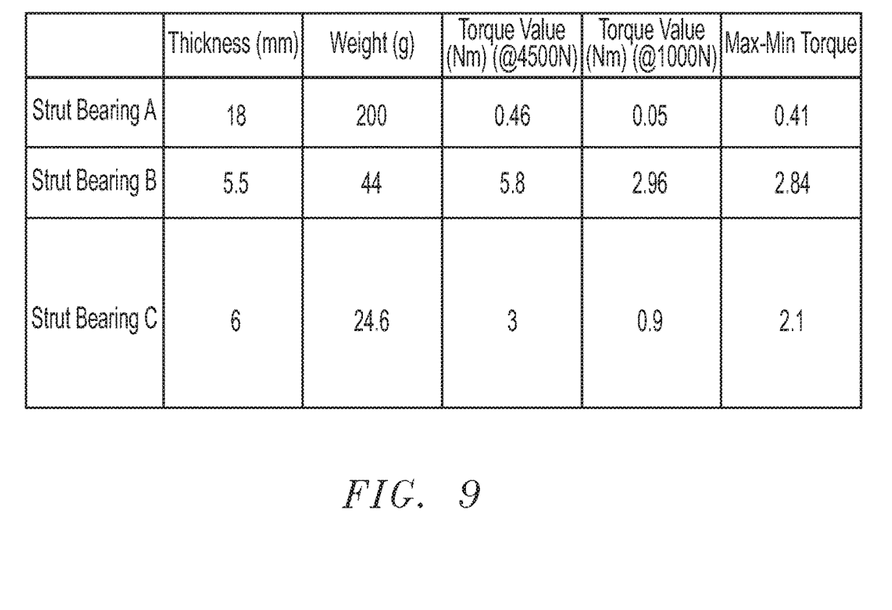
FIG. 9 includes a table of various metrics comparing the strut bearing 100 in accordance with an embodiment against prior art strut bearings.

FIG. 9 shows a table of various metrics comparing the strut bearing 100 in accordance with an embodiment against prior art strut bearings. Strut Bearing A shows a prior art ball bearing design for a prior art strut bearing. Strut Bearing B shows a prior art slide bearing design for a prior art strut bearing. Strut Bearing C shows a strut bearing 100 in according with an embodiment. As shown, strut bearing C performs with a lower thickness and weight while providing better torque performance than the prior art strut bearings.

According to still other embodiments, the strut bearing 100 can have a weight that may be not greater than about 100 g, such as, not greater than about 75 g, not greater than about 50 g, or even not greater than about 40 g.

In a number of embodiments, the strut bearing 100 can have a Max-Min torque of at least about 0.5 N·m, such as, at least about 1 N·m or at least about 1.5 N·m or at least about 2 N·m or even at least about 2.5 N·m. According to still other embodiments, the strut bearing 100 can have a Max-Min torque that may be not greater than about 5 N·m, such as, not greater than about 3 N·m or even not greater than about 2.5 N·m as measured at 4500 and 1000 N. It will be appreciated that the Max-Min torque of the strut bearing 100 may be within a range between any of the minimum and maximum values noted above. It will be further appreciated that the Max-Min torque of the strut bearing 100 may be any value between any of the minimum and maximum values noted above.

Figure 10:
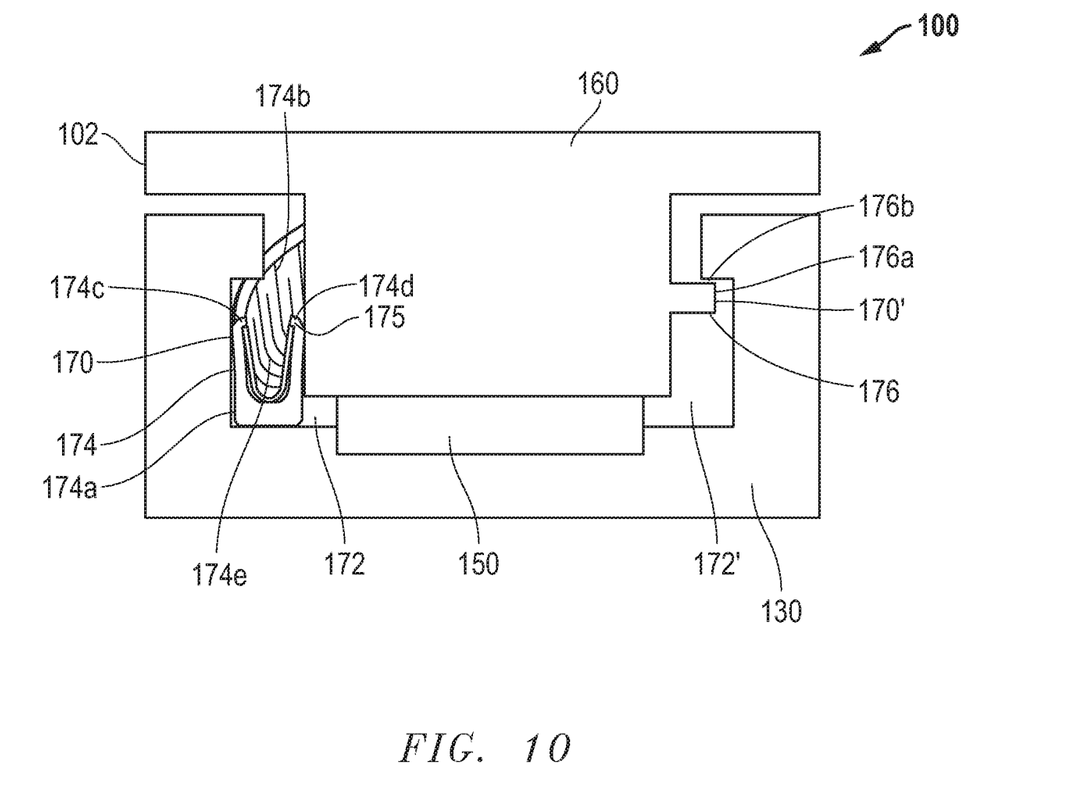
FIG. 10 includes a cross-sectional side view of an assembled strut bearing in accordance with an embodiment.

FIG. 10 includes a cross-sectional side view of an assembled strut bearing 100 in accordance with an embodiment. The strut bearing 100 may include similar features as discussed in other embodiments of the assembled strut bearing 100 herein. For example, the strut bearing 100 may include a housing 102 including a top piece 110 and a bottom piece 130. Further, the strut bearing 100 may further include at least one low friction component 150 including a low friction layer bonded to the top piece 110 or the bottom piece 130 of the housing 102. Optionally, the strut bearing 100 may further include at least one separation feature 170. Optionally, the strut bearing 100 may further include a plurality of separation features 170, 170' as shown in FIG. 10. In some embodiments, the at least one separation feature 170 may be contiguous with the top piece 110 or the bottom piece 130 of the housing 130. In some embodiments, the at least one separation feature 170 may be a constituent of the top piece 110 or the bottom piece 130 of the housing 130.

The at least one separation feature 170 may include a component adapted to prevent debris from entering into a cavity 172 located axially between the top piece 110 and the bottom piece 130 and circumferentially offset from the low friction component 150. The cavity 172, may house a grease or lubricant designed to allow and facilitate the low friction component 150 to provide a sliding surface between the top piece 110 and the bottom piece 130 of the assembled strut bearing 100.

In an embodiment, the at least one separation feature 170 may include a seal 174. In a number of embodiments, the seal 174 may include a jacket 174a and an energizing element 174b. The jacket 174a may include fingers 174c and 174d defining a recess 174e. In an embodiment, the fingers 174c and 174d may be symmetrical about a line 112 such that the recess 174e is also symmetrical. The energizing element 174b may be disposed within the recess 174e, such as partially disposed in the recess 174e or entirely disposed in the recess 174e. In an embodiment, at least one of the fingers 174c and 174d may include a distal flange 175 extending toward the recess 174e. The distal flange 175 may prevent dislodgment of the energizing element 174b from the recess 174e. As shown in FIG. 10, an exemplary seal 174 may include fingers 174c and 174d which provide an interface between the top piece 110 and the bottom piece 130 of the housing 102 to form the cavity 172.

The energizing element 174b may include a body adapted to provide an outwardly biasing force in at least one outwardly oriented direction, such as toward at least one of the fingers 174c and 174d. In an embodiment, the energizing element 174b may consist of a spring, such as, for example, a helical spring or a body having an O-shaped cross-sectional profile. In another embodiment, the energizing element 174b may have a cross-sectional profile selected from a D-shape, a U-shape, or a C-shape. In a particular embodiment, the energizing element 174b may have a cantilevered profile where surfaces of the energizing element 174b extend in a manner adjacent to at least one of the fingers 174c and 174d. The cantilevered portions of the energizing element 174b may outwardly bias the fingers 174c and 174d apart from one another. In an embodiment, the energizing element 174b may float relative to the jacket 174a. More particularly, the energizing element 174b may move freely with respect to the recess 174e. In another embodiment, the energizing element 174b may be coupled to the jacket 174a, such as, for example, by an adhesive, mechanical deformation of one or both of the jacket 174a and energizing element 174b, a threaded or non-threaded fastener, or by at least partially embedding the energizing element 174b within the jacket 174a. In an embodiment, ends of the energizing element 174b may be encapsulated within the jacket 174a so as to prevent dislodgement of the energizing element 174b from the jacket 174a. In embodiments utilizing adhesive, the adhesive layer (not illustrated) may be disposed between at least a portion of the energizing element 174b and the jacket 174a. In another embodiment, the jacket 174a may work as an energizing element itself and seal the system without the need of the additional energizing element 174b. This may be done through the orientation of the fingers 174c, 174d being formed to contact the top piece 110 or the bottom piece 130.

By way of a non-limiting example, the energizing element 174b may include a polymer, a metal, an alloy, or a combination thereof. In a particular embodiment, the energizing element 174b includes a metal. In certain embodiments, the jacket 174a may include a polymeric material. Exemplary polymers include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. In accordance with a particular embodiment, the jacket 102 may include a fluoropolymer. Exemplary fluoropolymers include fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. PTFE is used in accordance with particular embodiments described herein as it exhibits superior sealing characteristics while maintaining a low friction interface between moving components.

In an embodiment, the at least one separation feature 170 may include a mechanical interface 176. In an embodiment, the mechanical interface 176 may attach the top piece 110 and the bottom piece 130 of the housing 102 and create the cavity 172. As stated above, the mechanical interface 176 may attach via a different attachment means including at least one of screw threads or threadings, bolts, battens, buckle, clamp, clip, flange, frog, grommet, hook-and-eye, latch, tongue-and-groove, peg, nail, rivet, screw anchor, snap fastener, stitch, threaded fastener, tie, toggle bolt, wedge anchor, adhesive (including, but not limited to, the adhesives listed for the adhesive layer 1121 above), or may be attached together a different way. As shown in FIG. 10, an exemplary attachment means 176 may include a tongue 176a on the top piece 110 which provides an interface with a ledge 176b of the bottom piece 130 to form the cavity 172. It should be appreciated that different separation features 170 may be used herein in any combination with FIG. 10 showing just an exemplary combination of a seal 174 and a mechanical interface 176.

Use of the strut bearing 100 or assembly 500 may provide increased benefits by providing a reduced thickness and thus a reduced stack height for the assembly 100. Further, use of the strut bearing 100 or assembly 500 may provide reduced weight when compared to other existing strut bearings or assemblies. Further, use of the strut bearing 100 or assembly 500 may provide a lower torque when compared to other existing strut bearings or assemblies (not using ball bearings). Further, use of the strut bearing 100 or assembly 500 may provide a lower Max-Min torque of lower than 2.5 when compared to other existing strut bearings or assemblies (not using ball bearings).

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. A strut bearing comprising: a housing comprising a top piece and a bottom piece; a plurality of low friction components each comprising a low friction layer comprising a low friction material, wherein the plurality of low friction components are bonded to the top piece or the bottom piece of the housing.

Embodiment 2. A strut assembly comprising: an inner member comprising a strut rod; and a strut bearing disposed around the strut rod, the strut bearing comprising: a housing comprising a top piece and a bottom piece; and a plurality of low friction components each comprising a low friction layer comprising a low friction material, wherein the plurality of low friction components are bonded to the top piece or the bottom piece of the housing.

Embodiment 3. A method of forming a strut bearing comprising: forming a housing comprising a top piece and a bottom piece; and bonding at least one low friction component to at least one of the top piece or the bottom piece of the housing, the at least one low friction component comprising a low friction layer comprising a low friction material.

Embodiment 4. The strut bearing, strut assembly, or method of any of the preceding embodiments, wherein the at least one low friction component is overmolded with the top piece or the bottom piece of the housing.

Embodiment 5. The strut bearing, strut assembly, or method of embodiment 4, wherein at least one of the low friction component layers is exposed so that the low friction layer contacts an opposing surface of the other of the top piece or the bottom piece of the housing opposite to which the at least one low friction component is bonded.

Embodiment 6. The strut bearing, strut assembly, or method of embodiment 4, wherein a plurality of low friction component layers are exposed so that the plurality of low friction layers contact an opposing surface of the other of the top piece or the bottom piece of the housing opposite to which the at least one low friction component is bonded.

Embodiment 7. The strut bearing, strut assembly, or method of any of the preceding embodiments, wherein the top piece and the bottom piece of the housing are adapted to rotate relative to each other, wherein the rotation defines an annular track along the opposing surface along which the low friction layer slides.

Embodiment 8. The strut bearing, strut assembly, or method of embodiment 7, wherein the low friction layer contacts less than 80% of the surface area of the annular track, such as less than 70% of the surface area of the annular track, less than 60% of the surface area of the annular track, less than 50% of the surface area of the annular track, or less than 40% of the surface area of the annular track.

Embodiment 9. The strut bearing, strut assembly, or method of any of the preceding embodiments, wherein the at least one low friction component further comprises a substrate over which the low friction layer lies.

Embodiment 10. The strut bearing, strut assembly, or method of embodiment 4, wherein the substrate comprises a plurality of substrate segments each supporting a corresponding low friction layer.

Embodiment 11. The strut bearing, strut assembly, or method of any of embodiments 4-5, wherein the substrate comprises a polymer, a metal, or a ceramic.

Embodiment 12. The strut bearing, strut assembly, or method of any of the preceding embodiments, wherein the low friction material comprises a polymer comprising at least one of a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 13. The strut bearing, strut assembly, or method of any of the preceding embodiments, wherein the low friction material comprises a fluoropolymer.

Embodiment 14. The strut bearing, strut assembly, or method of any of embodiments 4-8, wherein the at least one low friction component further comprises an adhesive layer disposed between the substrate and the low friction layer.

Embodiment 15. The strut bearing, strut assembly, or method of embodiment 9, wherein the adhesive layer comprises epoxy resins, polyimide resins, polyether/polyamide copolymers, ethylene vinyl acetates, ETFE copolymers, or any combination thereof.

Embodiment 16. The strut bearing, strut assembly, or method of any of the preceding embodiments, wherein the housing comprises a polyamide.

Embodiment 17. The strut bearing, strut assembly, or method of any of the preceding embodiments, wherein the strut bearing further comprises a lubricant comprising at least one of water, a grease, an oil, or a solid-based lubricant.

Embodiment 18. The strut bearing, strut assembly, or method of any of the preceding embodiments, wherein the top piece and a bottom piece of the housing are adapted to couple together to create an internal void.

Embodiment 19. The strut bearing, strut assembly, or method of embodiment 14, wherein the at least one low friction component is disposed within the internal void.

Embodiment 20. The strut bearing, strut assembly, or method of any of the preceding embodiments, wherein at least one of the top piece or the bottom piece comprises a plurality of grooves defining channels.

Embodiment 21. The strut bearing, strut assembly, or method of embodiment 17, wherein a plurality of low friction components are disposed within the plurality of channels of at least one of the top piece or the bottom piece.

Embodiment 22. The strut bearing, strut assembly, or method of any of the preceding embodiments, wherein the strut bearing is a suspension strut bearing for a vehicle.

Embodiment 23. The strut bearing, strut assembly, or method of any of the preceding embodiments, wherein the strut bearing has a torque value of greater than about 1 Nm and less than about 5 Nm.

Embodiment 24. The strut bearing, strut assembly, or method of any of the preceding embodiments, wherein the strut bearing has a min-max torque value of greater than about 1 Nm and less than about 2.5 Nm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:

1. A strut bearing comprising:
a housing comprising a top piece and a bottom piece; and
a plurality of low friction components each comprising a low friction layer comprising a low friction material, wherein the plurality of low friction components are bonded to the top piece or the bottom piece of the housing, wherein at least two low friction components of the plurality of low friction components are circumferentially offset from one another, wherein at least one of the top piece or the bottom piece comprises a plurality of grooves into which the individual low friction components are disposed, wherein at least one groove of the plurality of grooves comprises two sidewalls.

2. The strut bearing of claim 1, wherein the at least one low friction component of the plurality of low friction components is overmolded with the top piece or the bottom piece of the housing.

3. The strut bearing of claim 2, wherein at least one of the low friction component layers is exposed so that the low friction layer contacts an opposing surface of the other of the top piece or the bottom piece of the housing opposite to which the at least one low friction component is bonded.

4. The strut bearing of claim 2, wherein a plurality of low friction component layers of the plurality of low friction components are exposed so that the plurality of low friction layers contact an opposing surface of the other of the top piece or the bottom piece of the housing opposite to which the at least one low friction component is bonded.

5. The strut bearing of claim 2, wherein the at least one low friction component further comprises an adhesive layer disposed between the substrate and the low friction layer.

6. The strut bearing of claim 1, wherein the top piece and the bottom piece of the housing are adapted to rotate relative to each other, wherein the rotation defines an annular track along the opposing surface along which the low friction layer slides.

7. The strut bearing of claim 6, wherein the low friction layer contacts less than 80% of the surface area of the annular track.

8. The strut bearing of claim 1, wherein the at least one low friction component of the plurality of low friction components further comprises a substrate over which the low friction layer lies.

9. The strut bearing of claim 8, wherein the substrate comprises a polymer, a metal, or a ceramic.

10. The strut bearing, of claim 1, wherein the low friction material comprises a polymer comprising at least one of a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

11. The strut bearing of claim 1, wherein the strut bearing further comprises a lubricant comprising at least one of water, a grease, an oil, or a solid-based lubricant.

12. The strut bearing of claim 1, wherein the top piece and a bottom piece of the housing are adapted to couple together to create an internal void.

13. The strut bearing of claim 12, wherein the at least one low friction component of the plurality of low friction components is disposed within the internal void.

14. The strut bearing of claim 1, wherein the plurality of grooves define channels, gaps, slots, or troughs.

15. The strut bearing of claim 14, wherein the plurality of low friction components are disposed within the plurality of channels of at least one of the top piece or the bottom piece.

16. The strut bearing of claim 14, wherein at least one of the plurality of grooves comprises a gap.

17. The strut bearing of claim 14, wherein at least one of the plurality of grooves comprises a slot having a polygonal cross-section.

18. A strut assembly comprising:
an inner member comprising a strut rod; and
a strut bearing disposed around the strut rod, the strut bearing comprising:
a housing comprising a top piece and a bottom piece; and
a plurality of low friction components each comprising a low friction layer comprising a low friction material, wherein the plurality of low friction components are bonded to the top piece or the bottom piece of the housing, wherein at least two low friction components of the plurality of low friction components are circumferentially offset from one another, wherein at least one of the top piece or the bottom piece comprises a plurality of grooves into which the individual low friction components are disposed, wherein at least one groove of the plurality of grooves comprises two sidewalls.

19. A strut bearing comprising: a housing comprising a top piece and a bottom piece; and a plurality of low friction components each comprising a low friction layer comprising a low friction material, wherein the plurality of low friction components are bonded to the top piece or the bottom piece of the housing, wherein at least two low friction components of the plurality of low friction components are circumferentially offset from one another, wherein at least one of the top piece or the bottom piece comprises a plurality of grooves into which the individual low friction components are disposed, wherein at least one low friction component of the plurality of low friction components has an inner radial edge that is spaced apart from an inner radial edge of the housing.

* * * * *